United States Patent [19]
Aoki et al.

[11] 3,981,636
[45] Sept. 21, 1976

[54] DIAPHRAGM VACUUM PUMP

[75] Inventors: Shigeru Aoki, Toyota; Katuya Suzuki, Seto; Tosimitu Sakai, Toyota, all of Japan

[73] Assignee: Toyota Jidosha Kogyo Kabushiki Kaisha, Toyota, Japan

[22] Filed: Nov. 3, 1975

[21] Appl. No.: 628,403

Related U.S. Application Data

[63] Continuation of Ser. No. 489,362, July 17, 1974, abandoned.

[30] Foreign Application Priority Data

July 20, 1973 Japan.................................. 48-81619

[52] U.S. Cl.............................. 417/566; 137/512.15; 137/516.13
[51] Int. Cl.²...................... F04B 21/02; F16K 15/14
[58] Field of Search............ 137/525, 525.3, 512.15, 137/512.4, 516.11, 516.13; 417/566

[56] References Cited
UNITED STATES PATENTS

| | | |
|---|---|---|
| 2,662,723 | 12/1953 | Coffey ................................ 137/525 |
| 3,403,696 | 10/1968 | Pynchon ........................ 137/516.13 |

*Primary Examiner*—William R. Cline
*Attorney, Agent, or Firm*—Stevens, Davis, Miller & Mosher

[57] ABSTRACT

To suck and discharge the air into and from a pressure reducing chamber of a vacuum pump, a check valve comprises a valve body made of plastic material in a mushroom configuration, and a plate member which includes a flat valve seat surface to be engaged with the annular rim of the cap portion of the valve body, an assembling hole to be coupled with the neck portion of the valve body, and a plurality of openings positioned symmetrically on a circle concentric with the assembling hole to normally be closed by the cap portion of the valve body. The neck portion of the valve body is assembled with the assembling hole under axially and radially compressed condition to air-tightly engage the annular rim of the cap portion of the valve body on the valve seat surface.

8 Claims, 6 Drawing Figures

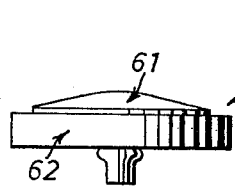
Fig.2
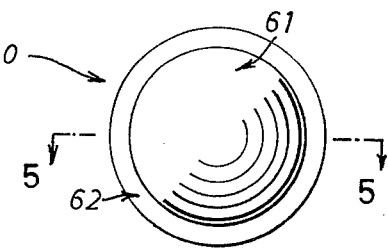
Fig.3
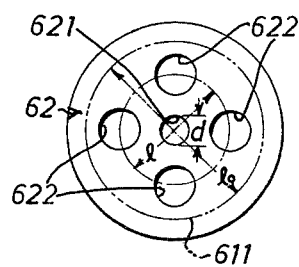
Fig.4
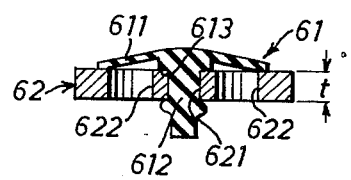
Fig.5
Fig.6
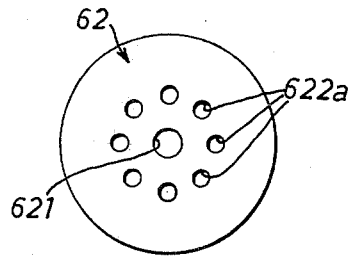

DIAPHRAGM VACUUM PUMP

This is a continuation of application Ser. No. 489,362 filed July 17, 1974 and now abandoned.

BACKGROUND OF THE INVENTION

The present invention relates to a check valve for a vacuum pump, and more particularly to an improvement of a check valve for sucking and discharging the air into and from a pressure reducing chamber of a diaphragm vacuum pump.

SUMMARY OF THE INVENTION

The prime object of the present invention is to provide a check valve for a diaphragm vacuum pump, wherein obtained is smooth response of the open/close operation of the check valve to the reciprocation of the diaphragm piston of the vacuum pump so as to increase the vacuum degree achieved out by the vacuum pump.

According to the present invention briefly summarized, there is provided with a check valve for a vacuum pump which comprises a valve body made of plastic material in a mushroom configuration, and a plate member including a flat valve seat surface to be engaged with the annular rim of the cap portion of the valve body, an assembling hole to be coupled with the neck portion of the valve body, and a plurality of openings positioned symmetrically on a circular path concentric with the assembling hole to normally be closed by the annular rim of the cap portion of the valve body and wherein the neck portion of the valve body is assembled with the assembling hole under axially and radially compressed condition to air-tightly engage the annular rim of the cap portion of the valve body on the valve seat surface of the plate member.

BRIEF DESCRIPTION OF THE DRAWING

Various other objects, features and attendant advantages of the present invention will be more fully appreciated as the same becomes better understood from the following detailed description, especially when considered in conjunction with the accompanying drawing, in which like reference numerals designate like or corresponding parts throughout the several views, and wherein:

FIG. 2 is an enlarged front view of the check valve shown in FIG. 1;

FIG. 3 depicts an enlarged plan view of the check valve shown in FIG. 1;

FIG. 4 is a plan view of the valve plate shown in FIG. 2;

FIG. 5 shows a view of elevational cross-section taken along line 5 — 5 of FIG. 3; and FIG. 6 shows a modification of the valve plate shown in FIG. 2.

DESCRIPTION OF THE PREFERRED EMBODIMENTS

Figure 1:
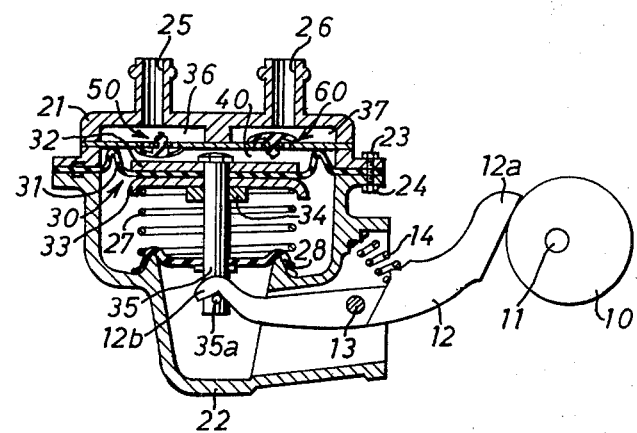
FIG. 1 shows a view of elevational cross-section of a vacuum pump having check valves in accordance with the present invention.

Now referring to the drawings, particularly to FIG. 1, there is disclosed a diaphragm vacuum pump having a check valve in accordance with the present invention. An eccentric cam 10 is mounted on a pump drive shaft 11 of a prime engine (not shown) of a vehicle. A rocker arm 12 is swingably journalled by a pivot pin 13 on the inner wall of a lower housing 22 of the vacuum pump. The outer end 12a of the rocker arm 12 engages at the bottom face thereof with the cam face of the eccentric cam 10 and the bottom face of the inner end 12b of the rocker arm 12 is in free or detachable engagement with a pin 35a securely mounted on the lower end portion of an operation rod 35 which will be discussed hereinafter in detail. This rocker arm 12 is normally biased clockwisely in the figure by a compression coil spring 14 interposed between a portion of the rocker arm 12 and the inner wall of the lower housing 22.

A diaphragm piston assembly 30 comprises substantially a disc diaphragm 31 and the operation rod 35. The disc diaphragm 31 is air-tightly sandwiched at its annular rim by the engaging faces of the annular flanges of an upper housing 21 and the lower housing 22 by way of bolts 23 and nuts 24. The upper portion of the operation rod 35 is fixedly mounted at the center of the disc diaphragm 31 by a fastening nut 34 onto a pair of plate members 32, 33 holding the diaphragm 31 tightly therebetween.

A pressure reducing chamber 40 is formed above the diaphragm piston assembly 30. This pressure reducing chamber 40 is connected to a suction chamber 36 and a discharge chamber 37 respectively by way of a suction check valve 50 and a discharge check valve 60, the two check valves 50 and 60 being made in accordance with the present invention. These check valves will be discussed later in detail.

The suction chamber 36 is provided with an inlet or suction port 25 connected to, for example, a vacuum cylinder of a conventional brake booster (not shown). The discharge chamber 37 is provided with an outlet or discharge port 26. The operation rod 35 is normally biased upwardly in the figure by a coil spring 27 which is interposed between the bottom face of the lower plate member 33 and the inner wall of the lower housing 22 by way of a sealing member 28.

In the vacuum pump of the above described construction, when the eccentic cam 10 is driven by the vehicle engine to make its rotation, the rocker arm 12 swings around the pivot pin 13 by the rotary engagement of the cam face of the eccentric cam 10 with the rocker arm 12 and the biasing forces of the coil springs 27 and 14. The swinging movements of the rocker arm 12 reciprocate the diaphragm piston assembly 30 vertically by way of the operation rod 35. In this instance, the operation rod 35 reciprocates by the biasing force of the spring 27, keeping the constant engagement with the bottom face of the inner end 12b of the rocker arm 12.

During the downward movements of the diaphragm piston assembly 30, the suction check valve 50 is opened and the discharge check valve 60 is closed, thereby to suck the air into the pressure reducing chamber 40 through the suction port 25, the suction chamber 36 and the suction check valve 50. And during the upward movements of the diaphragm piston 30, the suction check valve 50 is closed and the discharge check valve 60 is opened, thereby to discharge the air from the pressure reducing chamber 40 into the external opening through the discharge chamber 37 and the outlet port 26. Consequently, by repetition of the above operation, vacuum pressure is produced within the pressure reducing chamber 40.

Referring now to FIGS. 2 to 5, inclusive, a unique construction of the check valves 50 and 60 is hereinafter described in detail. Both of the valves 50 and 60 are provided with a same construction and the valve 60 is representatively exampled in the figures.

The check valve 60 comprises a valve body 61 made of plastic material such as synthetic rubber, synthetic resin and the like to have a mushroom configuration and a valve plate 62 made of hard synthetic resin such as nylon, polyethylene and polytetrafluoroethylene.

The valve body 61 is provided with a cap portion 611 engageable air-tightly with the upper flat surface of the valve plate 62 and a neck portion 612 to be inserted into an assembling hole 621 drilled through the center of the valve plate 62. The neck portion 612 includes a groove portion 613 thereof, the width $t_0$ of which is slightly smaller than the thickness $t$ of the valve plate 62. The valve plate 62 is provided with four valve openings 622 drilled therethrough symmetrically on a circular path concentric with the assembling hole 621. The upper flat surface of the valve plate 62 is finished to be smooth enough to air-tightly engage with the annular rim of the cap portion 611 of the valve body 61.

The assembling of the check valve 60 is completed by coupling the groove portion 613 of the valve body neck portion 612 into the assembling hole 621 of the valve plate 62 while the groove portion 613 is stretched axially. When the check valve 60 is assembled, the neck portion 612 is held pressedly on the valve plate 62 and the openings 622 are normally closed air-tightly by the cap-portion 611 of the valve body 61.

The number of the valve openings 622 is not necessarily four, but, for example as shown in FIG. 6, eight openings 622a of a smaller diameter may replace the four openings 622 shown in FIG. 4. The valve plate 62 could also be made of brass and in this particular case, the upper flat surface is preferably finished by buff-polishing.

The operation of the check valve 60 constructed as mentioned above is explained below. In the upward movements of the diaphragm piston assembly 30 of the previously disclosed vacuum pump, the annular rim of the cap portion 611 of the valve body 61 is removed upwardly from the upper surface of the valve plate 62 by pressure of the air discharged though the valve openings 622. Meanwhile, in the downward movements of the diaphragm piston assembly 30, the annular rim of the valve body cap portion 611 is air-tightly engaged with the upper surface of the valve plate 62 by vacuum pressure produced within the pressure reducing chamber 40. When the annular rim of the valve body cap portion 611 is removed upwardly from the valve plate 62, the cap and neck portions 611 and 612 are plastically deformed. This plastic deformation produces return plastic force, thereby to increase the engaging force of the annular rim of the cap portion 611 with the upper flat surface of the plate 62 when the valve body cap portion 611 returns its original position.

In discharging the air from the pressure reducing chamber 40, the valve openings 622 are opened by the elastic deformation of the annular rim of the cap portion 611 only. Consequently, the necessary valve opening pressure can be comparatively smaller than that needed for the conventional check valve.

Through the actual experiments, the check valve of the present invention has been found to have the best results in its operation under the following conditions, reference being particularly made to FIGS. 4 and 5;

1. $l/l_0 = 0.5 - 0.65$

Reference character $l_0$ represents the diameter of the cap portion 611 of the valve body 61 and reference character $l$ represents the diameter of the circle linking the centers of the valve openings 622, 2. $t/t_0 = 1.2 - 1.4$ Reference character $t_0$ represents the width of the groove portion 613 of the valve body neck portion 612 and reference character $t$ represents the thickness of the valve plate 62, and 3. $d/d_0 \leqq 1.1$ Reference character $d_0$ represents the normal diameter of the neck portion 612 of the valve body 61 and reference character $d$ represents the diameter of the assembling hole 621 of the valve plate 62.

It should now be very clear that the present invention renders such a check valve for vacuum pumps of the discussed type as of a very simple shape and construction, and of a low production cost due to a less number of parts and assembling processes, the check valve being yet capable to increase efficiently the vacuum degree obtainable by the vacuum pumps of the discussed type.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A diaphragm vacuum pump having a plurality of check valves for allowing flow into and out from a suction chamber having a diaphragm-piston assembly for creating suction therein wherein each check valve comprises:

a valve body made of plastic material in a mushroom configuration having a circular cap and a neck portion including an annular groove, a plate member including a flat valve seat surface to be engaged with the annular rim of the cap portion of said valve body, a circular assembling hole to be coupled with the neck portion of said valve body, and a plurality of circular openings disposed symmetrically on a circular path concentric with said assembling hole so as to be normally closed by the annular rim of the cap portion of said valve body, the neck portion of said valve body being assembled within said assembling hole so that said groove is registered with said assembling hole through said plate, said neck portion being under an axially and radially compressed condition to air-tightly engage the annular rim of the cap portion of said valve body against said valve seat surface of said plate member, the ratio of the radius of said circular path to the radius of the cap portion of the valve body being in the range from about 0.5 to about 0.65, the ratio of the width of said plate to the width of said annular groove being in the range from about 1.2 to about 1.4, and the ratio of the diameter of the assembling hole to the normal diameter of the neck portion of the valve body being about equal to or less than 1.1.

2. A check valve as set forth in claim 1, wherein said valve body is made of soft synthetic resin.

3. A check valve as set forth in claim 1, wherein said valve body is made of synthetic rubber.

4. A check valve as set forth in claim 1, wherein said plate member is made of hard synthetic resin.

5. A check valve as set forth in claim 1, wherein said plate member is made of Nylon.

6. A check valve as set forth in claim 1, wherein said plate member is made of polyethylene.

7. A check valve as set forth in claim 1, wherein said plate member is made of polytetrafluoroethylene.

8. A check valve as set forth in claim 1, wherein said plate member is made of brass, and said valve seat surface being finished by buff-polishing.

* * * * *